(12) United States Patent
Larsen et al.

(10) Patent No.: US 8,509,958 B2
(45) Date of Patent: Aug. 13, 2013

(54) POWER LIMITER SYSTEM (75) Inventors: Einar Vaughn Larsen, Ballston Lake, NY (US); Anthony Michael Klodowski, Hardy, VA (US); Sidney Allen Barker, Troutville, VA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 13/239,647

(22) Filed: Sep. 22, 2011

(65) Prior Publication Data
US 2012/0010759 A1 Jan. 12, 2012

Related U.S. Application Data (62) Division of application No. 12/639,672, filed on Dec. 16, 2009, now Pat. No. 8,046,109.

(51) Int. Cl.
*G06F 1/28* (2006.01)
*G06F 19/00* (2006.01)

(52) U.S. Cl.
USPC .................. 700/294; 700/287; 700/292

(58) Field of Classification Search
USPC ............. 700/287, 292–294; 361/20; 290/44
See application file for complete search history.

(56) References Cited

U.S. PATENT DOCUMENTS

| | | | |
|---|---|---|---|
| 4,229,694 A * | 10/1980 | Wilson et al. | 361/20 |
| 5,239,251 A | 8/1993 | Lauw | |
| 6,583,521 B1 | 6/2003 | Lagod et al. | |
| 6,693,409 B2 | 2/2004 | Lynch et al. | |
| 6,850,426 B2 | 2/2005 | Kojori et al. | |
| 7,289,920 B2 | 10/2007 | Suliman et al. | |
| 7,417,333 B2 | 8/2008 | Miller et al. | |
| 7,629,705 B2 | 12/2009 | Barker et al. | |
| 2004/0145188 A1 | 7/2004 | Janssen et al. | |
| 2004/0145357 A1 | 7/2004 | Lynch et al. | |
| 2005/0122083 A1 | 6/2005 | Erdman et al. | |
| 2006/0002157 A1 | 1/2006 | Petter et al. | |
| 2006/0132994 A1 | 6/2006 | Delmerico et al. | |
| 2007/0132248 A1 | 6/2007 | Weng et al. | |
| 2007/0290506 A1 | 12/2007 | Walling | |
| 2008/0093853 A1* | 4/2008 | Barker et al. | 290/44 |
| 2008/0238215 A1 | 10/2008 | Ye et al. | |

* cited by examiner

*Primary Examiner* — Kavita Padmanabhan
*Assistant Examiner* — Steven Garland
(74) *Attorney, Agent, or Firm* — James McGinniss Esq.; Armstrong Teasdale LLP (57) ABSTRACT

A power limiter system is described. The power limiter system is configured to receive a phase locked loop (PLL) error signal; analyze the PLL error signal to identify an occurrence of a grid contingency event; generate a first power command signal corresponding to an occurrence of the grid contingency event; and, transmit the first command signal to a converter interface controller. The system further includes a memory configured to store at least one variable that corresponds to the PLL error signal upon identification of an occurrence of the grid contingency event.

19 Claims, 8 Drawing Sheets

POWER LIMITER SYSTEM

CROSS-REFERENCE TO RELATED APPLICATION

This application is a divisional of U.S. patent application Ser. No. 12/639,672, filed Dec. 16, 2009 now U.S. Pat. No. 8,046,109 titled Method and Systems for Operating a Wind Turbine, which is hereby incorporated by reference in its entirety.

BACKGROUND OF THE INVENTION

The subject matter described herein relates generally to controlling operation of a wind turbine, and more specifically, to controlling operation of a wind turbine in response to a power grid contingency event.

Wind turbine generators utilize wind energy to produce electrical power. Wind turbine generators typically include a rotor having multiple blades that transform wind energy into rotational motion of a drive shaft, which in turn is utilized to drive an electrical generator to produce electrical power. Each of the multiple blades may be pitched to increase or decrease the rotational speed of the rotor. A power output of a wind turbine generator increases with wind speed until the wind speed reaches a rated wind speed for the turbine. At and above the rated wind speed, the wind turbine generator operates at a rated power. The rated power is an output power at which a wind turbine generator can operate with a level of fatigue to turbine components that is predetermined to be acceptable. At wind speeds higher than a certain speed, or at a wind turbulence level that exceeds a predetermined magnitude, typically referred to as a "trip limit" or "monitor set point limit," wind turbines may be shut down, or the loads may be reduced by regulating the pitch of the blades or braking the rotor, in order to protect wind turbine components against damage.

Variable speed operation of the wind turbine generator facilitates enhanced capture of energy by the wind turbine generator when compared to a constant speed operation of the wind turbine generator, however, variable speed operation of the wind turbine generator produces electricity having varying voltage and/or frequency. More specifically, the frequency of the electricity generated by the variable speed wind turbine generator is proportional to the speed of rotation of the rotor. A power converter may be coupled between the electric generator and a utility grid. The power converter outputs electricity having a fixed voltage and frequency for delivery on the utility grid.

A balance between a torque on the rotor created by interaction of the rotor blades and the wind and a generator torque facilitates stable operation of the wind turbine. Wind turbine adjustments, for example, blade pitch adjustments, or grid events, for example, low voltages or zero voltages on the grid, may cause an imbalance between the torque on the rotor caused by the wind and the generator torque. The electric generator has an air gap torque between the generator rotor and stator that opposes the torque applied by the rotor. The power converter also controls the air gap torque which facilitates controlling the power output of the electric generator. However, the wind turbine may not be able to operate through certain grid events, or may sustain wear and/or damage due to certain grid events, due to a time period required for adjustments to wind turbine operation to take effect after detecting the grid event.

BRIEF DESCRIPTION OF THE INVENTION

In one aspect, a method for controlling operation of a wind turbine included within a power generation and delivery system is provided. The method includes measuring at least one operating condition of the power generation and delivery system. The method also includes transmitting, to a power limiter system, an operating condition feedback signal that corresponds to the operating condition. The method also includes analyzing the operating condition feedback signal to identify an occurrence of a grid contingency event and generating a real current command signal corresponding to an occurrence of a grid contingency event. The method also includes transmitting the real current command signal to a controller and applying the real current command signal to power converter performance to facilitate reducing pole-slipping. The method also includes storing, in a memory, at least one variable corresponding to the operating condition upon the occurrence of a grid contingency event.

In another aspect, a grid-dependent power limiter system for reducing pole-slipping is provided. The system includes a power limiter configured to receive at least one of a phase locked loop (PLL) error signal and a terminal grid voltage feedback signal and to generate a power command signal based on at least one of the PLL error signal and the terminal grid voltage feedback signal. The system also includes a power regulator coupled to the power limiter. The power regulator is configured to receive the power command signal, generate a real current command signal, and transmit the real current command signal to a controller. The system also includes a memory configured to store at least one variable that corresponds to an operating condition measured upon an occurrence of a grid contingency event.

In yet another aspect, a power generation and distribution system is provided. The power generation and distribution system includes an electric generator and a power conversion assembly coupled to the electric generator and a utility grid. The power conversion assembly is configured to receive power generated by the electric generator and convert the power received to a power suitable for transmission over the utility grid. The power generation and distribution system also includes a power limiter system communicatively coupled to the power conversion assembly and configured to provide a real current control signal to the power conversion assembly. The real current control signal based at least partially on at least one measured indicator of a grid contingency event. The power limiter system includes a memory configured to store at least one variable that corresponds to the measured indicator of a grid contingency event upon an occurrence of the grid contingency event.

DETAILED DESCRIPTION OF THE INVENTION

As used herein, the term "blade" is intended to be representative of any device that provides reactive force when in motion relative to a surrounding fluid. As used herein, the term "wind turbine" is intended to be representative of any device that generates rotational energy from wind energy, and more specifically, converts kinetic energy of wind into mechanical energy. As used herein, the term "wind turbine generator" is intended to be representative of any wind turbine that generates electrical power from rotational energy generated from wind energy, and more specifically, converts mechanical energy converted from kinetic energy of wind to electrical power.

Technical effects of the methods, systems, and computer-readable media described herein include at least one of: (a) measuring a terminal grid voltage; (b) providing, to a power limiter system, a terminal grid voltage feedback signal that corresponds to the terminal grid voltage; (c) generating, using the power limiter system, a real current command signal based at least partially on the terminal grid voltage feedback signal; (d) providing the real current command signal to the controller; and (e) applying the real current command signal to power converter performance.

The methods, systems, and computer readable media described herein facilitate identification of a grid contingency event and a rapid response to the grid contingency event. The rapid response reduces or substantially eliminates pole-slipping in the wind turbine generator and facilitates stabilizing the wind turbine and utility grid.

Figure 1:
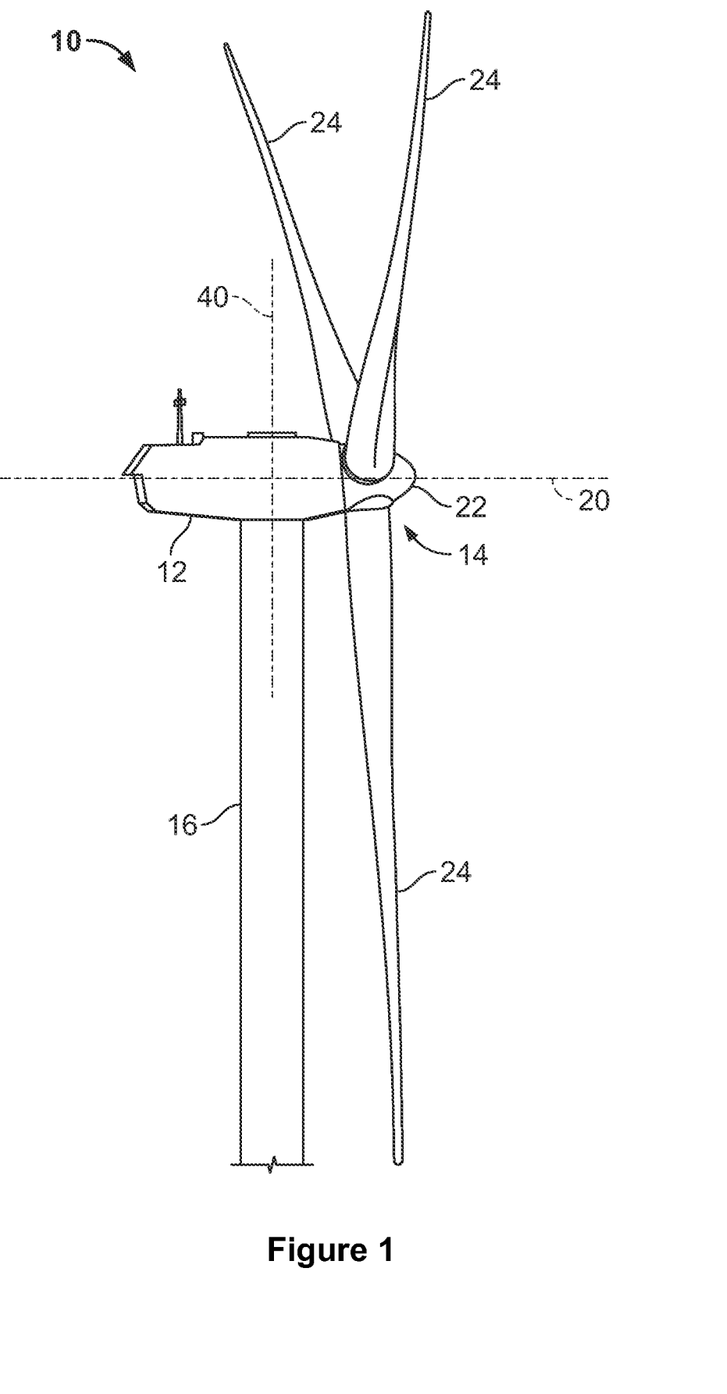
FIG. 1 is a perspective view of a portion of an exemplary wind turbine.
Figure 2:
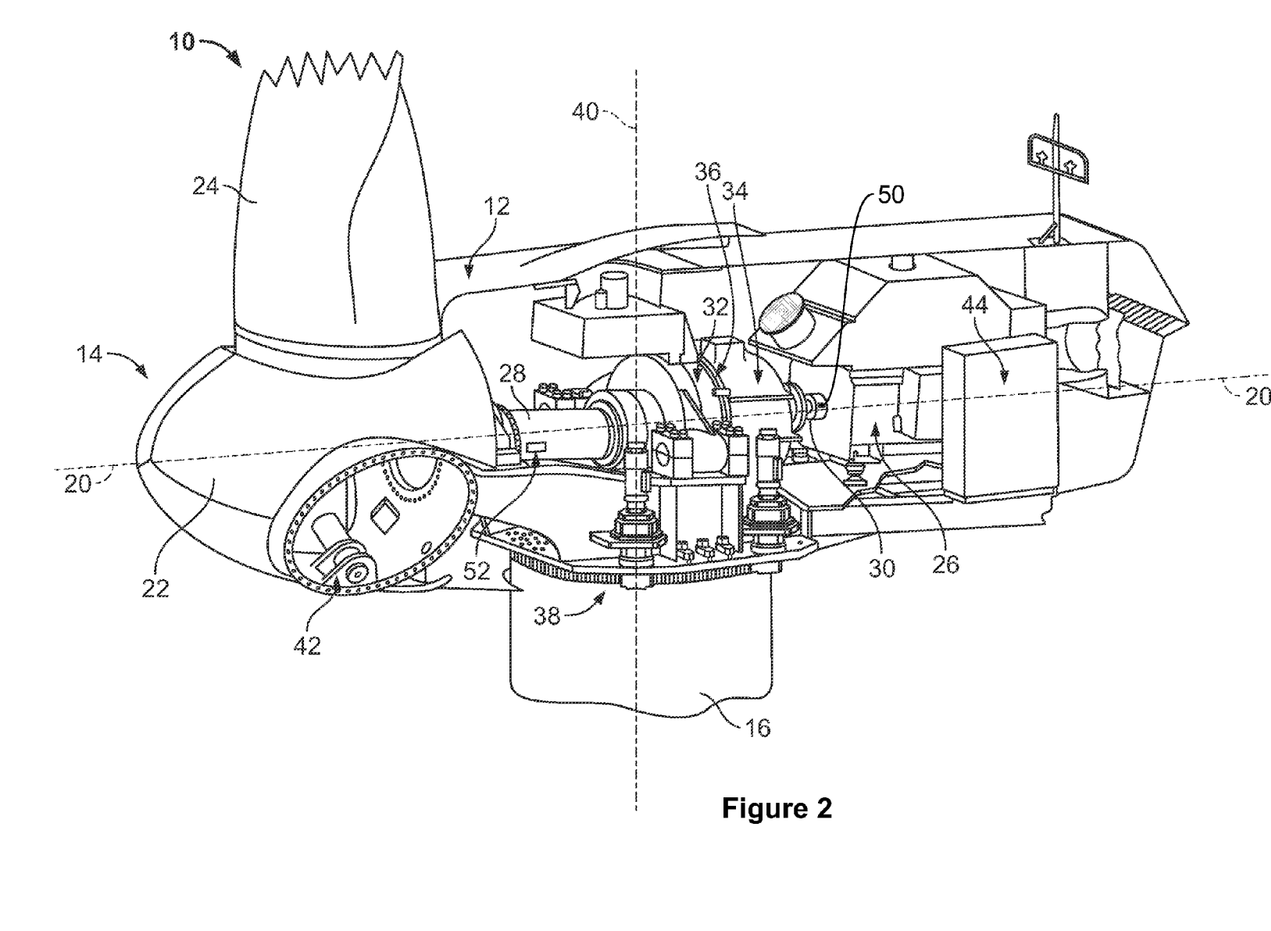
FIG. 2 is a partially cut-away view of a portion of the wind turbine shown in FIG. 1.

FIG. 1 is a perspective view of an exemplary wind turbine 10. FIG. 2 is a partially cut-away perspective view of a portion of wind turbine 10. Wind turbine 10 described and shown herein is a wind turbine generator for generating electrical power from wind energy. Moreover, wind turbine 10 described and illustrated herein includes a horizontal-axis configuration, however, in some embodiments, wind turbine 10 may include, in addition or alternative to the horizontal-axis configuration, a vertical-axis configuration (not shown). Wind turbine 10 may be coupled to an electrical load (not shown in FIG. 1), such as, but not limited to, a power grid, for receiving electrical power therefrom to drive operation of wind turbine 10 and/or its associated components and/or for supplying electrical power generated by wind turbine 10 thereto. Although only one wind turbine 10 is shown in FIGS. 1 and 2, in some embodiments, a plurality of wind turbines 10 may be grouped together, sometimes referred to as a "wind farm."

Wind turbine 10 includes a body or nacelle 12 and a rotor (generally designated by 14) coupled to nacelle 12 for rotation with respect to nacelle 12 about an axis of rotation 20. In the exemplary embodiment, nacelle 12 is mounted on a tower 16, however, in some embodiments, in addition or alternative to tower-mounted nacelle 12, nacelle 12 may be positioned adjacent the ground and/or a surface of water. The height of tower 16 may be any suitable height enabling wind turbine 10 to function as described herein. Rotor 14 includes a hub 22 and a plurality of blades 24 (sometimes referred to as "airfoils") extending radially outwardly from hub 22 for converting wind energy into rotational energy. Although rotor 14 is described and illustrated herein as having three blades 24, rotor 14 may have any number of blades 24. Blades 24 may each have any length that allows wind turbine 10 to function as described herein. For example, in some embodiments, one or more rotor blades 24 are about one-half meter long, while in some embodiments one or more rotor blades 24 are about fifty meters long. Other examples of blade 24 lengths include ten meters or less, about twenty meters, about thirty-seven meters, and about forty meters. Still other examples include rotor blades between about fifty and about one-hundred meters long, and rotor blades greater than one-hundred meters long.

Despite how rotor blades 24 are illustrated in FIG. 1, rotor 14 may have blades 24 of any shape, and may have blades 24 of any type and/or any configuration, whether such shape, type, and/or configuration is described and/or illustrated herein. One example of another type, shape, and/or configuration of blades 24 is a Darrieus wind turbine, sometimes referred to as an "eggbeater" turbine. Yet another example of another type, shape, and/or configuration of blades 24 is a Savonious wind turbine. Moreover, wind turbine 10 may, in some embodiments, be a wind turbine wherein rotor 14 generally faces upwind to harness wind energy, and/or may be a wind turbine wherein rotor 14 generally faces downwind to harness energy. Of course, in any of the embodiments, rotor 14 may not face exactly upwind and/or downwind, but may face generally at any angle (which may be variable) with respect to a direction of the wind to harness energy therefrom.

Referring now to FIG. 2, wind turbine 10 includes an electrical generator 26 coupled to rotor 14 for generating electrical power from the rotational energy generated by rotor 14. Generator 26 may be any suitable type of electrical generator, such as, but not limited to, a wound rotor induction generator, a double-fed induction generator (DFIG, also known as dual-fed asynchronous generators), a permanent magnet (PM) synchronous generator, an electrically-excited synchronous generator, and a switched reluctance generator. Generator 26 includes a stator (not shown) and a rotor (not shown) with an air gap included therebetween. Rotor 14 includes a rotor shaft 28 coupled to rotor hub 22 for rotation therewith. Generator 26 is coupled to rotor shaft 28 such that rotation of rotor shaft 28 drives rotation of the generator rotor, and therefore operation of generator 26. In the exemplary embodiment, the generator rotor has a generator shaft 30 coupled thereto and coupled to rotor shaft 28 such that rotation of rotor shaft 28 drives rotation of the generator rotor. In other embodiments, the generator rotor is directly coupled to rotor shaft 28, sometimes referred to as a "direct-drive wind turbine." In the exemplary embodiment, generator shaft 30 is coupled to rotor shaft 28 through a gearbox 32, although in other embodiments generator shaft 30 is coupled directly to rotor shaft 28.

The torque of rotor 14 drives the generator rotor to thereby generate variable frequency AC electrical power from rotation of rotor 14. Generator 26 has an air gap torque between the generator rotor and stator that opposes the torque of rotor 14. A power conversion assembly 34 is coupled to generator 26 for converting the variable frequency AC to a fixed frequency AC for delivery to an electrical load (not shown in FIG. 2), such as, but not limited to a power grid (not shown in FIG. 2), coupled to generator 26. Power conversion assembly 34 may include a single frequency converter or a plurality of frequency converters configured to convert electricity generated by generator 26 to electricity suitable for delivery over the power grid. Power conversion assembly 34 may also be referred to herein as a power converter. Power conversion assembly 34 may be located anywhere within or remote to wind turbine 10. For example, power conversion assembly 34 may be located within a base (not shown) of tower 16.

In some embodiments, wind turbine 10 may include a rotor speed limiter, for example, but not limited to a disk brake 36. Disk brake 36 brakes rotation of rotor 14 to, for example, slow rotation of rotor 14, brake rotor 14 against full wind torque, and/or reduce the generation of electrical power from electrical generator 26. Furthermore, in some embodiments, wind turbine 10 may include a yaw system 38 for rotating nacelle 12 about an axis of rotation 40 for changing a yaw of rotor 14, and more specifically for changing a direction faced by rotor 14 to, for example, adjust an angle between the direction faced by rotor 14 and a direction of wind.

In one embodiment, wind turbine 10 includes a variable blade pitch system 42 for controlling, including but not limited to changing, a pitch angle of blades 24 (shown in FIGS. 1-2) with respect to a wind direction. Pitch system 42 may be coupled to system controller 44 for control thereby. Pitch system 42 is coupled to hub 22 and blades 24 for changing the pitch angle of blades 24 by rotating blades 24 with respect to hub 22. The pitch actuators may include any suitable structure, configuration, arrangement, means, and/or components, whether described and/or shown herein, such as, but not limited to, electrical motors, hydraulic cylinders, springs, and/or servomechanisms. Moreover, the pitch actuators may be driven by any suitable means, whether described and/or shown herein, such as, but not limited to, hydraulic fluid, electrical power, electro-chemical power, and/or mechanical power, such as, but not limited to, spring force.

Figure 3:
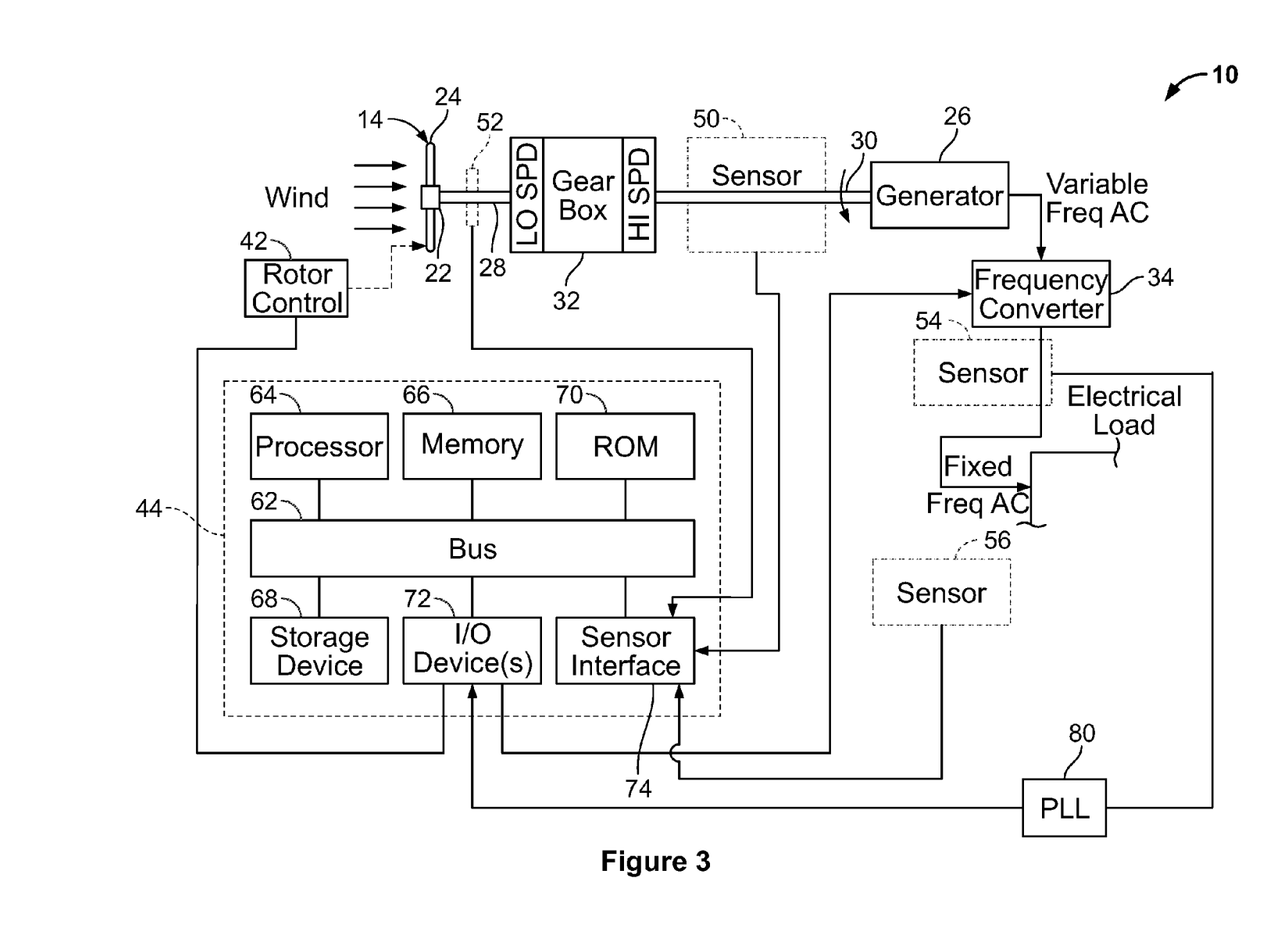
FIG. 3 is a block diagram of the wind turbine shown in FIG. 1.

FIG. 3 is a block diagram of an exemplary embodiment of wind turbine 10. In the exemplary embodiment, wind turbine 10 includes one or more system controllers 44 coupled to at least one component of wind turbine 10 for generally controlling operation of wind turbine 10 and/or controlling operation of the components thereof, regardless of whether such components are described and/or shown herein. For example, in the exemplary embodiment system controller 44 is coupled to pitch system 42 for generally controlling rotor 14. In the exemplary embodiment, system controller 44 is mounted within nacelle 12 (shown in FIG. 2), however, additionally or alternatively, one or more system controllers 44 may be remote from nacelle 12 and/or other components of wind turbine 10. System controllers 44 may be used for overall system monitoring and control including, without limitation, pitch and speed regulation, high-speed shaft and yaw brake application, yaw and pump motor application, and/or fault monitoring. Alternative distributed or centralized control architectures may be used in some embodiments.

In an exemplary embodiment, wind turbine 10 includes a plurality of sensors, for example, sensors 50, 54, and 56. Sensors 50, 54, and 56 measure a variety of parameters including, without limitation, operating conditions and atmospheric conditions. Each sensor 50, 54, and 56 may be an individual sensor or may include a plurality of sensors. Sensors 50, 54, and 56 may be any suitable sensor having any suitable location within or remote to wind turbine 10 that allows wind turbine 10 to function as described herein. In some embodiments, sensors 50, 54, and 56 are coupled to system controller 44 for transmitting measurements to system controller 44 for processing thereof.

In some embodiments, system controller 44 includes a bus 62 or other communications device to communicate information. One or more processor(s) 64 are coupled to bus 62 to process information, including information from sensors 50, 54, and 56 and/or other sensor(s). Processor(s) 64 may include at least one computer. As used herein, the term computer is not limited to integrated circuits referred to in the art as a computer, but broadly refers to a processor, a microcontroller, a microcomputer, a programmable logic controller (PLC), an application specific integrated circuit, and other programmable circuits, and these terms are used interchangeably herein.

System controller 44 may also include one or more random access memories (RAM) 66 and/or other storage device(s) 68. RAM(s) 66 and storage device(s) 68 are coupled to bus 62 to store and transfer information and instructions to be executed by processor(s) 64. RAM(s) 66 (and/or storage device(s) 68, if included) can also be used to store temporary variables or other intermediate information during execution of instructions by processor(s) 64. System controller 44 may also include one or more read only memories (ROM) 70 and/or other static storage devices coupled to bus 62 to store and provide static (i.e., non-changing) information and instructions to processor(s) 64. Processor(s) 64 process information transmitted from a plurality of electrical and electronic devices that may include, without limitation, speed and power transducers. Instructions that are executed include, without limitation, resident conversion and/or comparator algorithms. The execution of sequences of instructions is not limited to any specific combination of hardware circuitry and software instructions.

System controller 44 may also include, or may be coupled to, input/output device(s) 72. Input/output device(s) 72 may include any device known in the art to provide input data to system controller 44 and/or to provide outputs, such as, but not limited to, yaw control and/or pitch control outputs. Instructions may be provided to RAM 66 from storage device 68 including, for example, a magnetic disk, a read-only memory (ROM) integrated circuit, CD-ROM, and/or DVD, via a remote connection that is either wired or wireless providing access to one or more electronically-accessible media. In some embodiments, hard-wired circuitry can be used in place of or in combination with software instructions. Thus, execution of sequences of instructions is not limited to any specific combination of hardware circuitry and software instructions, whether described and/or shown herein. Also, in the exemplary embodiment, input/output device(s) 72 may include, without limitation, computer peripherals associated with an operator interface such as a mouse and a keyboard (neither shown in FIG. 3). Alternatively, other computer peripherals may also be used that may include, for example, a scanner (not shown in FIG. 3). Furthermore, in the exemplary embodiment, additional output channels may include, for example, an operator interface monitor (not shown in FIG. 3). System controller 44 may also include a sensor interface 74 that allows system controller 44 to communicate with sensors 50, 54, and 56 and/or other sensor(s). Sensor interface 74 may include one or more analog-to-digital converters that convert analog signals into digital signals that can be used by processor(s) 64.

In an exemplary embodiment, wind turbine 10 includes a phase locked loop (PLL) regulator 80. PLL regulator 80 is coupled to sensor 54. In the exemplary embodiment, sensor 54 is a voltage transducer configured to measure a terminal grid voltage output by frequency converter 34. Alternatively, PLL regulator 80 is configured to receive a plurality of voltage measurement signals from a plurality of voltage transducers. In an example of a three-phase generator, each of three voltage transducers is electrically coupled to each one of three phases of a grid bus. PLL regulator 80 may be configured to receive any number of voltage measurement signals from any number of voltage transducers that allow PLL regulator 80 to function as described herein.

Figure 4:
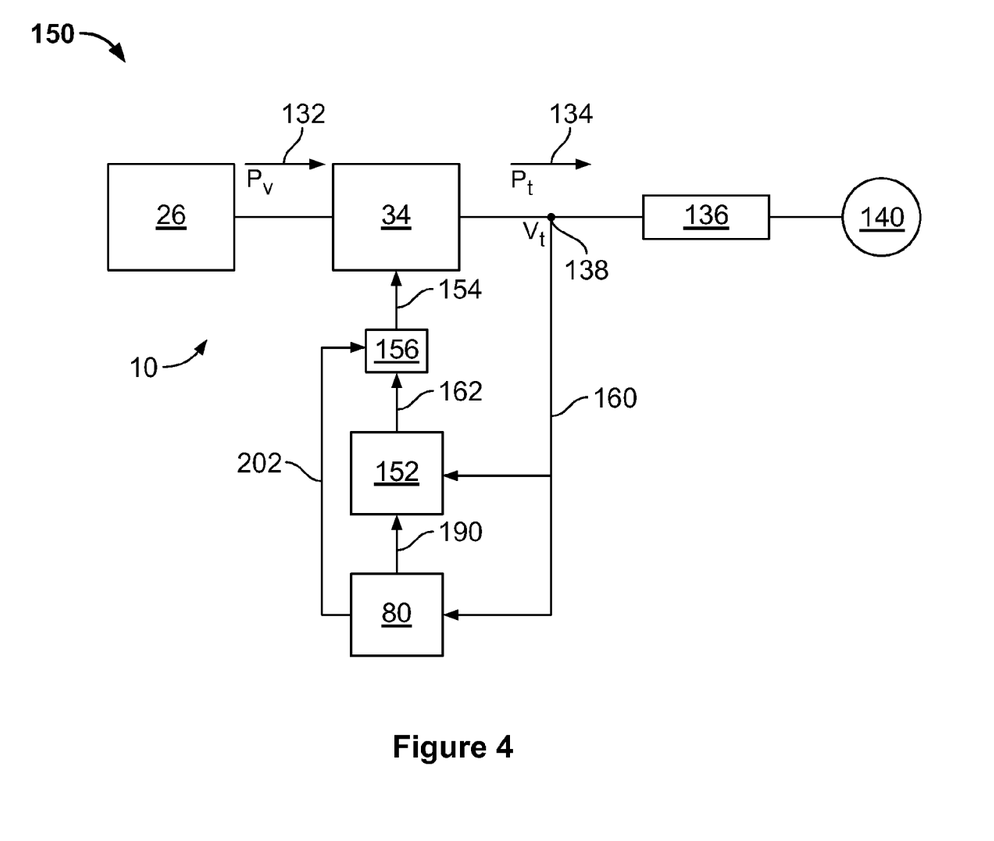
FIG. 4 is a block diagram of an exemplary power generation and delivery system that may include the wind turbine shown in FIG. 1.

FIG. 4 is a block diagram of an exemplary power generation and delivery system 150. Power generation and delivery system 150 may be used with, or included within, wind turbine 10 (shown in FIGS. 1 and 2). System 150 includes an energy source, for example, generator 26. Although described herein as wind turbine generator 26, the energy source may include any type of electrical generator that allows system 150 to function as described herein. System 150 also includes a power converter, such as, power converter 34. Power converter 34 receives variable frequency electrical power 132 generated by generator 26 and converts electrical power 132 to an electrical power 134 (referred to herein as terminal power 134) suitable for transmission over an electric power transmission and distribution grid 136 (referred to herein as utility grid 136). A terminal voltage (Vt) 138 is defined at a node between power converter 34 and utility grid 136. A load 140 is coupled to utility grid 136 where a Thevenin voltage is defined. As described above, variable speed operation of wind turbine 10 facilitates enhanced capture of energy when compared to a constant speed operation of wind turbine 10, however, variable speed operation of wind turbine 10 produces electrical power 132 having varying voltage and/or frequency. More specifically, the frequency of electrical power 132 generated by variable speed wind turbine generator 26 is proportional to the speed of rotation of rotor 14 (shown in FIG. 1). In the exemplary embodiment, power converter 34 outputs terminal power 134 having a substantially fixed voltage and frequency for delivery on utility grid 136.

Power converter 34 also controls an air gap torque of generator 26. The air gap torque is present between the generator rotor (not shown in FIG. 3) and the generator stator (not shown in FIG. 3) and opposes the torque applied to generator 26 by rotor 14. A balance between a torque on rotor 14 created by interaction of blades 24 (shown in FIG. 1) and the wind and the air gap torque facilitates stable operation of wind turbine 10. Wind turbine adjustments, for example, blade pitch adjustments, or grid events, for example, low voltage transients or zero voltage transients on utility grid 136, may cause an imbalance between the torque on rotor 14 caused by the wind and the air gap torque. Power converter 34 controls the air gap torque which facilitates controlling the power output of generator 26, however, wind turbine 10 may not be able to operate through certain grid events, or may sustain wear and/or damage due to certain grid events, due to a time period required for adjustments to wind turbine operation to take effect after detecting the grid event.

In the exemplary embodiment, system 150 includes a grid-dependent power limiter system 152. In the exemplary embodiment, a controller, for example, but not limited to, controller 44 (shown in FIG. 3), is programmed to perform the functions of grid-dependent power limiter system 152. However, in alternative embodiments, the functions of grid-dependent power limiter system 152 may be performed by any circuitry configured to allow system 150 to function as described herein. Power limiter system 152 is configured to identify the occurrence of a grid contingency event, and provide power converter 34 with signals that facilitate reducing pole-slipping and providing a stable recovery from the grid event. In certain embodiments, power converter 34 responds according to the signals provided by power limiter system 152 and substantially eliminates pole-slipping.

A grid event, also referred to herein as a grid contingency event, may leave utility grid 136 in a degraded mode where the grid impedance is too high to accommodate power generated by generator 26. An example of a grid event includes a short-circuit fault on one of the transmission lines within utility grid 136. Electrical transmission protection actions remove the faulted portion of utility grid 136 to permit operation of the remaining unfaulted portion of utility grid 136. A transmission path remains that is degraded in its ability to transmit power from system 150 to load 140. Such grid events cause a brief period of low voltage on utility grid 136 prior to clearing the faulted portion of the utility grid 136. Typically, terminal voltage 138 will approach zero volts at the time of the grid event. Often, a low voltage transient and/or a zero voltage transient will cause a generator trip and associated consequences to the semiconductor devices (e.g., potential damage to components of wind turbine 10). System 150 facilitates low voltage ride through capability (LVRT) as well as zero voltage ride through (ZVRT) capability for wind turbine 10 such that a potential for a wind turbine generator trip and associated consequences to the semiconductor devices are mitigated during low voltage transients and/or zero voltage transients.

Such a grid event may lead to a post-fault condition where the high impedance of utility grid 136 prevents utility grid 136 from transmitting the pre-fault power from wind generator 26 (i.e., the impedance of utility grid 136 is too high to carry the pre-fault power from wind generator 26). In a synchronous machine, this condition may cause a rotor angle of the generator rotor to move past the point where a restraining torque of utility grid 136 is able to balance the mechanical input to wind turbine 10, which is referred to herein as "pole-slipping." In a machine with a power electronic interface (e.g., power converter 34), this condition may lead to a series of rapid pulsations of power and voltage. Such pulsations are analogous to pole-slipping, although with power converter 34, control algorithms govern the behavior rather than the physics of synchronous machines. Without precautions in the power converter control algorithms, pole-slipping may occur.

The methods and systems described herein facilitate preventing the pulsating pole-slipping and facilitate stabilizing system 150 upon detection of pole-slipping in a short period of time such that higher-level controls have time to determine actions and communicate those actions to bring the system to an acceptable condition.

As shown in FIG. 4, in the exemplary embodiment, power conversion assembly 34 is configured to receive control signals 154 from a converter interface controller 156. Control signals 154 are based on sensed operating conditions or operating characteristics of wind turbine 10 as described herein and used to control the operation of power conversion assembly 34. Examples of measured operating conditions may include, but are not limited to, a terminal grid voltage, a PLL error, a stator bus voltage, a rotor bus voltage, and/or a current. For example, sensor 54 measures terminal grid voltage 138 and transmits a terminal grid voltage feedback signal 160 to power limiter system 152. Power limiter system 152 generates a power command signal 162 based at least partially on the feedback signal 160 and transmits power command signal 162 to converter interface controller 156. In an alternative embodiment, converter interface controller 156 is included within system controller 44. Other operating condition feedback from other sensors also may be used by controller 44 and/or converter interface controller 156 to control power conversion assembly 34. Using this feedback information, and for example, switching control signals, stator synchronizing switch control signals and system circuit breaker control (trip) signals may be generated in any known manner. For example, for a grid voltage transient with predetermined characteristics, controller 44 and/or converter interface controller 156 will at least temporarily substantially suspend firing of the IGBTs within power conversion assembly 34. Such suspension of operation will substantially mitigate electric power being channeled through power conversion assembly 34 to approximately zero.

Figure 5:
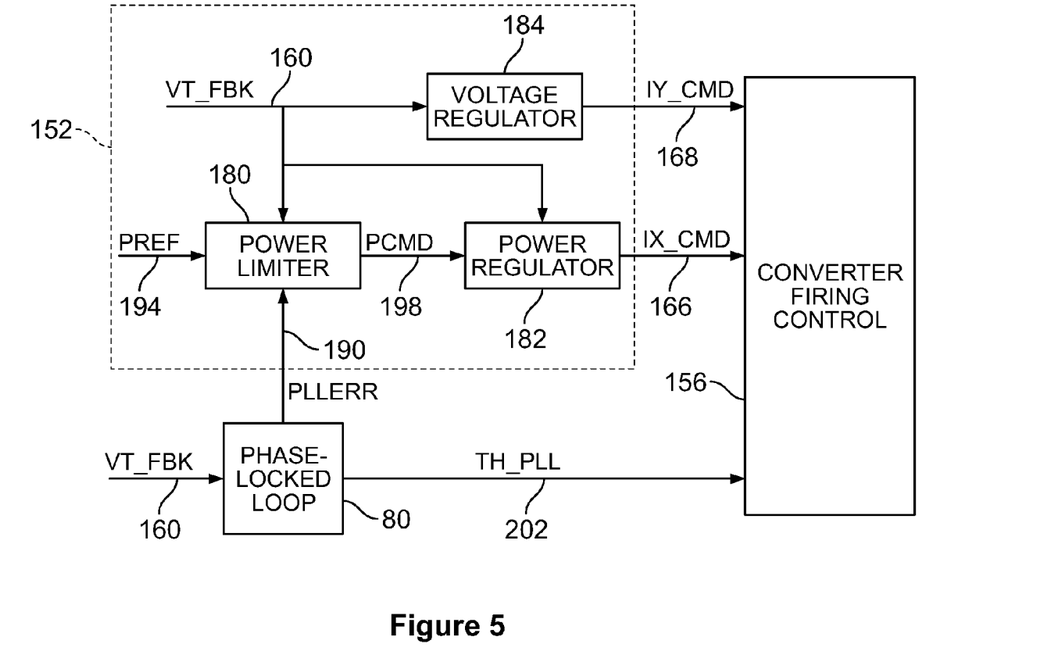
FIG. 5 is a block diagram of an exemplary power limiter system that may be included within the power generation and delivery system shown in FIG. 4.

FIG. 5 is a block diagram of an exemplary power limiter system, for example, power limiter system 152. Power limiter system 152 is configured to output power command signal 162 (shown in FIG. 4), which in the exemplary embodiment, is at least one of a real current command signal 166 and a reactive current command signal 168. In the exemplary embodiment, power limiter system 152 includes a power limiter 180, a power regulator 182, and a voltage regulator 184. In the exemplary embodiment, power limiter 180 receives at least one measured operating condition of system 150. The at least one measured operating condition may include, but is not limited to, a PLL error signal 190 from PLL regulator 80 and terminal grid voltage feedback signal 160 from sensor 54. Power limiter 180 also receives a stored reference power control signal 194 from, for example, system controller 44 (shown in FIG. 3). In some embodiments, power limiter 180 receives terminal grid voltage feedback signal 160 and stored reference power control signal 194. In other embodiments, power limiter 180 receives PLL error signal 190 and stored reference power control signal 194. In other embodiments, power limiter 180 receives both PLL error signal 190 and terminal grid voltage feedback signal 160, as well as stored reference power control signal 194. In the exemplary embodiment, power limiter 180 generates a power command signal 198 and transmits power command signal 198 to power regulator 182. Power regulator 182 generates real current command signal 166 and transmits real current command signal 166 to converter interface controller 156. Converter interface controller 156 may also be referred to herein as a converter firing control. As described above, PLL regulator 80 may be included within system controller 44, or may be coupled to, but separate from, system controller 44.

In the exemplary embodiment, PLL regulator 80 receives terminal voltage feedback signal 160. For example, PLL regulator 80 may receive terminal voltage feedback signal 160 (shown in FIG. 3 as Vt) provided by sensor 54 (shown in FIG. 3). As described above, PLL regulator 80 generates PLL error signal 190 and a PLL phase angle signal 202. PLL phase angle signal 202 is transmitted to converter interface controller 156 for control of assembly 34 and for subsequent control of electrical currents injected onto utility grid 136 (shown in FIG. 4).

Figure 6:
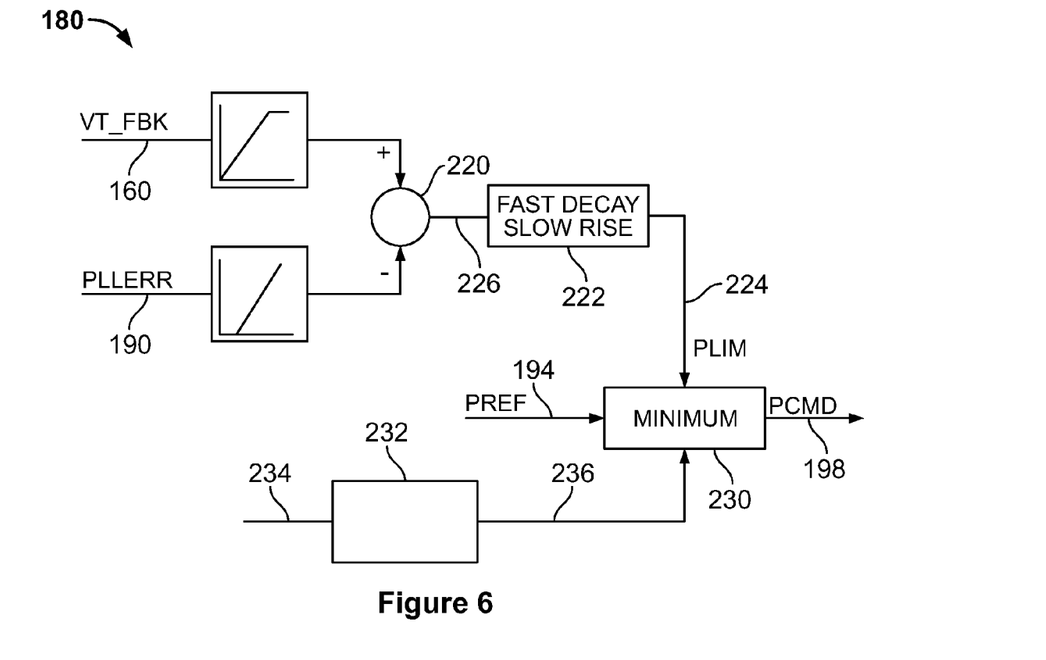
FIG. 6 is a block diagram of an exemplary grid-dependent power limiter that may be included within the power limiter system shown in FIG. 5.

FIG. 6 is a block diagram of an exemplary grid-dependent power limiter, for example, power limiter 180 (shown in FIG. 5). As described above, in the event of a grid contingency such as a weak grid, the impedance of utility grid 136 is too high to accommodate the power generated by generator 26. As a result, pole-slipping may occur causing repetitive voltage depressions and power pulsations on utility grid 136 and wind turbine 10. Also, the weak grid causes a reduction in the Thevenin equivalent voltage at load 140 on utility grid 136. To facilitate preventing pole-slipping from occurring after a grid contingency event, a power command to converter interface controller 156 is rapidly reduced. More specifically, real current command signal 166 is generated by power regulator 182 and transmitted to converter interface controller 156. Real current command signal 166 instructs converter interface controller 156 to decrease a real component of current that conversion assembly 34 tries to inject onto utility grid 136. Furthermore, to support the terminal voltage, upon a drop in terminal voltage identified by voltage regulator 184 based on terminal voltage feedback signal 160, voltage regulator 184 generates reactive current command signal 168 and sends reactive current command signal 168 to converter interface controller 156. Current command signal 168 instructs converter interface controller 156 to increase a reactive component of current injected onto utility grid 136 upon occurrence of a grid contingency event.

In the exemplary embodiment, power regulator 182 receives power command signal 198 from power limiter 180. Power command signal 198 provides power regulator 182 with a signal corresponding to an occurrence of a grid contingency event. As described above, a low terminal voltage is an indication that a grid contingency event has occurred. Also, a high PLL error is an indication that a grid contingency event has occurred. To determine if a grid contingency event has occurred, a function block 220 within power limiter 180 receives terminal voltage feedback signal 160 and/or PLL error signal 190. A power limit function block 222 generates a power limit control signal 224 based on an output 226 of function block 220. Power limit control signal 224 and reference power control signal 194 are provided to a comparator function block 230. Comparator function block 230 generates power command signal 198 corresponding to the lesser of power limit control signal 224 and reference power control signal 194.

In the exemplary embodiment, upon occurrence of a grid contingency event, terminal voltage feedback signal 160 indicates a sudden reduction in the terminal voltage. Accordingly, power limit function block 222 generates a rapidly reducing power limit control signal 224. Rapidly reducing power limit control signal 224 facilitates stabilizing system 150 while substantially reducing pole-slipping. After terminal voltage feedback signal 160 indicates that the grid contingency event has ended (e.g., the terminal voltage increases), power limit function block 222 generates a slowly rising power limit control signal 224. The real current injected onto utility grid 136 rises according to power limit control signal 224. Slowly increasing the power injected onto utility grid 136 facilitates preventing power oscillations. Furthermore, slowly increasing the power injected onto utility grid 136 provides time for higher level changes in the operation of system 150 that allow system 150 to adapt to the grid contingency event.

In the exemplary embodiment, power limit control signal 224 is compared to reference power control signal 194. Comparator function block 230 generates power command signal 198 based on the lower of power limit control signal 224 and reference power control signal 194. For example, power limit control signal 224 is lower than reference power control signal 194 after occurrence of a grid contingency event, and as such, power command signal 198 is generated based on power limit control signal 224. During normal operation of system 150 (i.e., no grid contingency event), reference power control signal 194 is less than power limit control signal 224, and power command signal 198 is based on the predetermined reference power control signal 194.

As described above, PLL error signal 190 and terminal voltage feedback signal 160 are both indicators of the occurrence of a grid contingency event. For example, a PLL error signal 190 that corresponds to a high PLL error and a terminal voltage feedback signal 160 that corresponds to a reduction in terminal voltage 138 are indications that a grid contingency event has occurred. In response to a high PLL error signal 190 and/or a low terminal voltage feedback signal 160, power limit function block 222 generates a rapidly reducing power limit control signal 224. After PLL error signal 190 and/or terminal voltage feedback signal 160 indicate that the grid contingency event has ended (e.g., the PLL error and/or the terminal voltage returns to a predefined level), power limit function block 222 generates a slowly rising power limit control signal 224. The power injected onto utility grid 136 rises according to power limit control signal 224. As described above, slowly increasing the power injected onto utility grid 136 facilitates preventing power oscillations.

In an alternative embodiment, power limiter 180 also includes a higher-level control 232. Although described as included within power limiter 180, higher-level control 232 may also be positioned remotely from power limiter 180. As described above, slowly increasing the power injected onto utility grid 136 facilitates preventing power oscillations. Slowly increasing the power injected onto utility grid 136 also provides time for higher level changes in the operation of system 150 that allow system 150 to adapt to the grid contingency event. Higher-level control 232 receives at least one wind farm input signal, for example, input signal 234. Wind farm input signal 234 may correspond to changes in utility grid 136, for example, but not limited to, breaker contact signals or communication signals from remote substations. Input signal 234 may also correspond to a voltage measurement at a point of common coupling for a plurality of wind turbines within a wind farm. In the exemplary embodiment, higher-level control 232 generates a curtailment signal 236 based at least partially on input signal 234, and provides curtailment signal 236 to select wind turbines of the plurality of wind turbines. More specifically, curtailment signal 236 is provided to comparator function block 230, where power command signal 198 is generated. For example, if input signal 234 received by higher-level control 232 corresponds to more than a predefined number of remote substations unable to carry the level of power currently being received, higher-level control 232 will generate curtailment signal 236, which upon receipt, instructs comparator function block 230 to generate a power command signal 198 that curtails a wind turbine's output below that which would otherwise be available from the prevailing wind conditions. In another example, if higher-level control 232 determines that the voltage at the point of common coupling for a plurality of wind turbines has remained below a predefined level for more than a predefined period of time, higher-level control 232 will generate curtailment signal 236, which upon receipt, instructs comparator function block 230 to generate a power command signal 198 that curtails a wind turbine's output below that which would otherwise be available from the prevailing wind conditions.

In the exemplary embodiment, power limiter system 152 also includes a memory, for example, memory 66 (shown in FIG. 3). Memory 66 is configured to store data related to operation of wind turbine 10. For example, memory 66 may store at least one variable that correspond to, for example but not limited to, PLL error 190 and voltage feedback 160. More specifically, controller 44 is configured to sample the current value of predefined variables and store the current value in memory 66 upon occurrence of an event. For example, upon occurrence of a grid contingency event, current values for PLL error 190 and voltage feedback 160 are stored in memory 66. Memory 66 may be accessed by a user to, for example, monitor operation of wind turbine 10.

Figure 7:
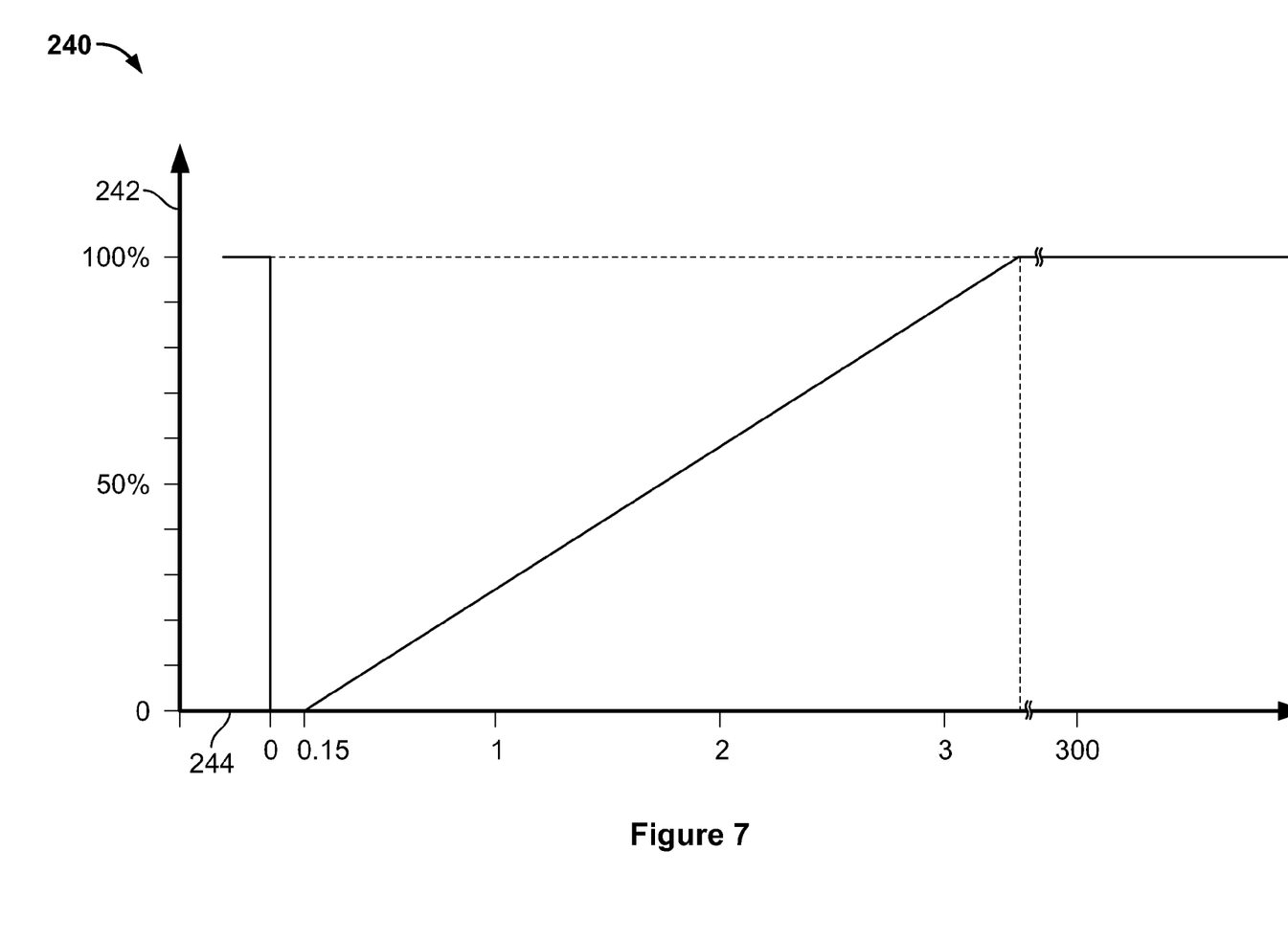
FIG. 7 is a graphical view of a grid line voltage versus time that may be associated with the wind turbine shown in FIG. 1.

FIG. 7 is a graphical view of grid line voltage versus time that may be associated with wind turbine 10 (shown in FIG. 1). Graph 240 includes an ordinate (y-axis) 242 that represents grid line voltage in units of percent (%). Y-axis 242 illustrates 0% at the graph origin and extends up to 100%. A grid line voltage of 0% is indicative of zero voltage on utility grid 136 (shown in FIG. 4). A grid line voltage of 100% indicates terminal grid voltage 138 is 100% of the nominal pre-determined voltage associated with wind turbine 10. Graph 240 also includes an abscissa (x-axis) 244 that represents time in seconds (s). A zero voltage transient is illustrated to start at time equals zero seconds. This zero voltage transient may correspond to a grid event, for example, a de-coupled load that causes a zero voltage grid condition. In the exemplary embodiment, the zero voltage condition on utility grid 136 is 0.15 seconds wherein the voltage on utility grid 136 fully recovers to 100% at approximately 3.5 seconds after the initiation of the transient. Alternatively, a length of time of the zero voltage condition and the characteristics of a grid voltage recovery depend upon a variety of factors known in the art.

When the voltage decreases to zero as shown in FIG. 7, it is likely that there are faults that prevent generator 26 from transmitting electrical power to utility grid 136. In the event that the wind continues to rotate rotor 14 (shown in FIG. 1), generator 26 continues to generate energy that is not converted to electrical energy. Instead, the energy accelerates rotor 14 until a trip feature is initiated that may include a manual trip or an automated overspeed trip.

FIGS. 8-15 show operating characteristics of system 150 (shown in FIG. 4) after occurrence of a grid contingency event. As described above, system 150 includes power limiter system 152 (shown in FIG. 5). More specifically, FIGS. 8-11 show exemplary operating characteristics of system 150 when power limiter 180 of power limiter system 152 is provided with terminal voltage feedback signal 160 (shown in FIG. 5). FIGS. 12-15 show exemplary operating characteristics of system 150 when power limiter 180 is provided with PLL error signal 190.

Figure 8:
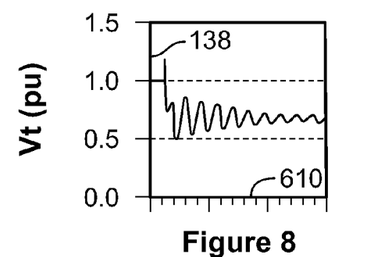
FIGS. 8-15 show operating characteristics of the system shown in FIG. 4 after occurrence of a grid contingency event.
Figure 9:
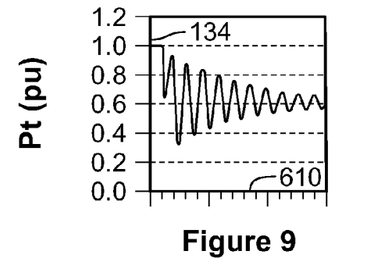
Figure 10:
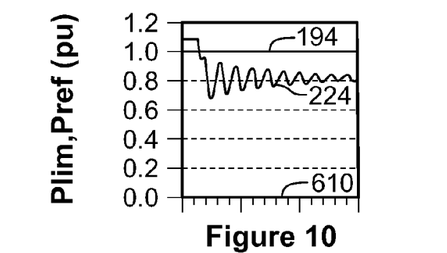
Figure 11:
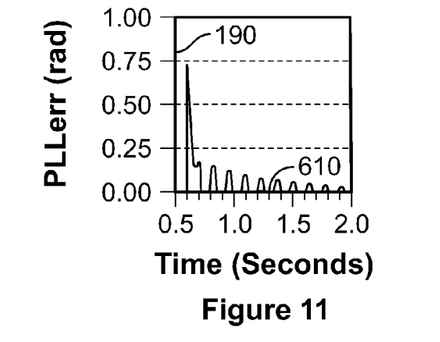

FIGS. 8-11 show an effect of a grid contingency event on system 150 (shown in FIG. 4) when power limiter 180 is provided with terminal voltage feedback signal 160. FIG. 8 shows an effect of a grid contingency event on terminal grid voltage 138 (shown in FIG. 4) over time 610. FIG. 9 shows an effect of a grid contingency event on terminal power 134 (shown in FIG. 4) over time 610. FIG. 10 shows an effect of a grid contingency event on power limit control signal 224 (shown in FIG. 6) and reference power control signal 194 (shown in FIG. 6) over time 610. FIG. 11 shows an effect of a grid contingency event on PLL error signal 190 (shown in FIG. 6). Once the grid contingency event is identified, or more specifically, once a rapidly decreasing terminal grid voltage 138 provides an indication that a grid contingency event is occurring, power limit control signal 224 is rapidly reduced to below a level of reference power control signal 194. Reducing power limit control signal 224 causes power converter 34 to reduce a level of real current applied to utility grid 136, and as shown in FIGS. 8-11, facilitates stabilizing system 150 (i.e., reduces oscillations of Vt, Pt, and PLL error).

Figure 12:
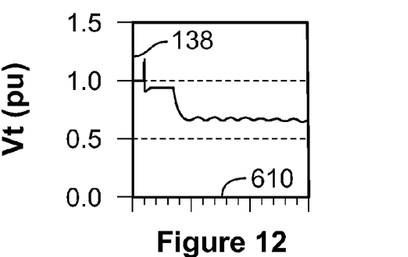
Figure 13:
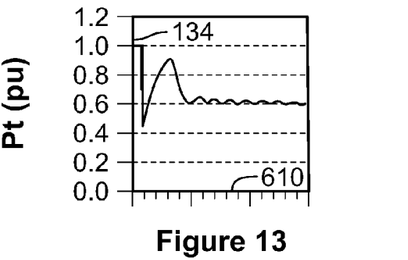
Figure 14:
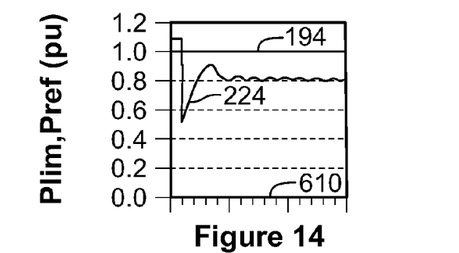
Figure 15:
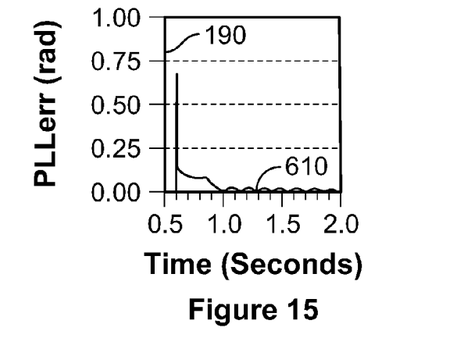

FIGS. 12-15 shows an effect of a grid contingency event on system 150 (shown in FIG. 4) when power limiter 180 is provided with PLL error signal 190. FIG. 12 shows an effect of a grid contingency event on terminal grid voltage 138 (shown in FIG. 4) over time 610. FIG. 13 shows an effect of a grid contingency event on terminal power 134 (shown in FIG. 4) over time 610. FIG. 14 shows an effect of a grid contingency event on power limit control signal 224 (shown in FIG. 6) and reference power control signal 194 (shown in FIG. 6) over time 610. FIG. 15 shows an effect of a grid contingency event on PLL error signal 190 (shown in FIG. 6). Once the grid contingency event is identified, or more specifically, once an increasing PLL error signal 190 provides an indication that a grid contingency event is occurring, power limit control signal 224 is rapidly reduced to below a level of reference power control signal 194. Reducing power limit control signal 224 causes power converter 34 to reduce a level of real current applied to utility grid 136, and as shown in FIGS. 12-15, facilitates stabilizing system 150 (i.e., reduces oscillations of Vt, Pt, and PLL error).

Figure 16:
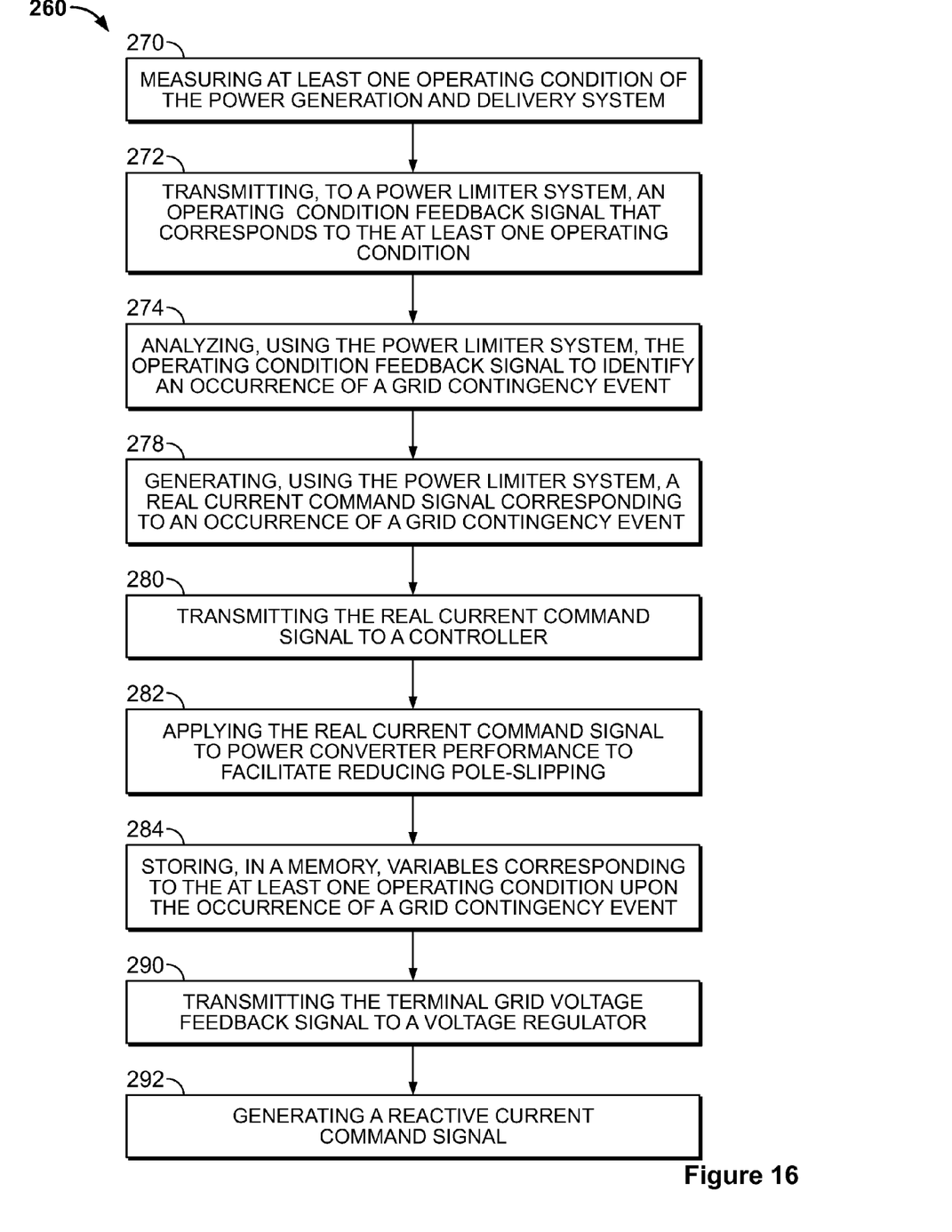
FIG. 16 is a flow chart showing an exemplary method of controlling operation of the wind turbine shown in FIG. 1.

FIG. 16 is a flow chart 260 illustrating an exemplary method for controlling operation of a wind turbine, for example, wind turbine 10 (shown in FIG. 1), included within a power generation and delivery system, for example, power generation and delivery system 150 (shown in FIG. 4). Although described as a method for operating a wind turbine, the method may also be applied to operation of more than one wind turbine 10 (i.e., a wind farm). In the exemplary embodiment, the method includes measuring 270 at least one operating condition of power generation and delivery system 150, wherein the at least one operating condition is dependent upon an occurrence of a grid contingency event. As described above, measured operating conditions provide an indication of an occurrence of a grid contingency event. The measured operating condition may include, but is not limited to, at least one of a phase locked loop (PLL) error and a terminal grid voltage. The method also includes transmitting 272, to a power limiter system, an operating condition feedback signal that corresponds to the at least one operating condition. More specifically, PLL error signal 190 (shown in FIG. 5) may be generated by a PLL regulator, for example, PLL regulator 80 (shown in FIG. 5) and transmitted 272 to power limiter system 152 (shown in FIG. 5). PLL error signal 190 may correspond to a sustained phase error tracked by PLL regulator 80. Also, terminal grid voltage feedback signal 160 (shown in FIG. 5) may be measured by sensor 54 (shown in FIG. 3) and transmitted 272 to power limiter system 152.

In the exemplary embodiment, the method also includes analyzing 274, using power limiter system 152, the operating condition feedback signal to identify an occurrence of a grid contingency event. For example, an increasing PLL error signal 190 provides an indication that a grid contingency event is occurring and/or a rapidly decreasing terminal grid voltage 138 provides an indication that a grid contingency event is occurring. The method also includes generating 278, using power limiter system 152, a real current command signal corresponding to an occurrence of a grid contingency event. For example, a real current command signal, such as real current command signal 166 (shown in FIG. 5) is generated by power limiter system 152. Real current command signal 166 may be based at least partially on the terminal grid voltage and is used as an indicator of an occurrence of a grid contingency event. For example, a real current command signal 166 is generated that corresponds to an occurrence of a grid contingency event when terminal grid voltage 138 is below a predefined level.

Real current command signal 166 may also be based at least partially on PLL error signal 190. For example, a real current command signal 166 that corresponds to an occurrence of a grid contingency event is generated when PLL error signal 190 is above a predefined level.

Real current command signal 166 may also be based on both terminal grid voltage 138 and PLL error signal 190. In this alternative embodiment, if terminal grid voltage 138 and/or PLL error signal 190 indicate the occurrence of a grid contingency event, power limiter system 152 outputs a real current command signal 166 that corresponds to an occurrence of a grid contingency event.

The method also includes transmitting 280 real current command signal 166 to a controller, for example, converter interface controller 156 (shown in FIG. 5) and applying 282 real current command signal 166 to performance of a power converter, for example, power conversion assembly 34 (shown in FIG. 3). Upon receipt of real current command signal 166 that corresponds to an occurrence of a grid contingency event, power conversion assembly 34 rapidly reduces a real current output. Furthermore, upon receipt of a real current command signal 166 that indicates a recovery from the grid contingency event, power conversion assembly 34 slowly increases real current output by power conversion assembly 34 to facilitate a stable recovery from the grid contingency event and substantially eliminate pole-slipping.

In the exemplary embodiment, the method also includes storing 284, in a memory, at least one variable corresponding to the at least one operating condition upon the occurrence of a grid contingency event. For example, variables corresponding to the at least one operating condition may be stored 284 in memory 66 (shown in FIG. 3). Memory 66 may store a plurality of variables that correspond to, for example but not limited to, PLL error 190 and voltage feedback 160. More specifically, controller 44 is configured to sample the current value of predefined variables and store the current value in memory 66 upon occurrence of an event. For example, upon occurrence of a grid contingency event, current values for PLL error 190 and voltage feedback 160 are stored in memory 66. Memory 66 may be accessed by a user to, for example, monitor operation of wind turbine 10 and/or verify proper operation of wind turbine 10, power limiter system 152, and/or power generation and delivery system 150.

The method may also include transmitting 290 terminal grid voltage 138 to a voltage regulator, for example, voltage regulator 184 (shown in FIG. 5) and generating 292 a reactive current command signal, for example, reactive current command signal 168, at voltage regulator 184 that increases the reactive current output by power conversion assembly 34 when terminal grid voltage 138 indicates the occurrence of a grid contingency event. The increased reactive current supports terminal grid voltage 138 until the grid contingency event is resolved or higher-level control of wind turbine 10 operation is activated. In some embodiments, a higher-level control, for example, higher-level control 232 (shown in FIG. 6), receives a wind farm operating condition, generates a curtailment signal based at least partially on the wind farm operating condition, and transmits the curtailment signal to power limiter system 152.

The above-described embodiments facilitate efficient and cost-effective operation of a wind turbine. The wind turbine includes a power limiter system that is provided with at least one of a terminal voltage feedback signal and a PLL error signal. The terminal voltage feedback signal and the PLL error signal facilitate identification of a grid contingency event and signals provided by the methods and systems described herein facilitate rapid response to an identified grid contingency event. A rapid reduction in real current applied to the utility grid after identification of a grid contingency event substantially eliminates pole-slipping. A slow increase in real current applied to the utility grid upon recovery of the utility grid provides time for higher-level control systems to balance the power generated by the wind turbine, or by wind turbines within a wind farm, with a load level on the utility grid. The method and systems described herein facilitate achieving zero and low voltage ride through which may prevent a generator trip and/or support the grid during the voltage transient.

Exemplary embodiments of a wind turbine, power limiter system, and methods for operating a wind turbine in response to an occurrence of a grid contingency event are described above in detail. The methods, wind turbine, and power limiter system are not limited to the specific embodiments described herein, but rather, components of the wind turbine, components of the power limiter system, and/or steps of the methods may be utilized independently and separately from other components and/or steps described herein. For example, the power limiter system and methods may also be used in combination with other wind turbine power systems and methods, and are not limited to practice with only the power system as described herein. Rather, the exemplary embodiment can be implemented and utilized in connection with many other wind turbine or power system applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A grid-dependent power limiter system comprising:
   a power limiter configured to:
      receive a phase locked loop (PLL) error signal;
      analyze the PLL error signal to identify an occurrence of a grid contingency event;
      generate a first power command signal corresponding to an occurrence of the grid contingency event; and,
      transmit the first command signal to a converter interface controller;
   a voltage regulator configured to:
      receive a terminal grid voltage feedback signal;
      generate a second power command signal based at least partially on the terminal grid voltage feedback signal; and,
      transmit the second power command signal to the converter interface controller; and,
   a memory configured to store at least one variable that corresponds to the PLL error signal upon identification of an occurrence of the grid contingency event.

2. A system in accordance with claim 1, wherein the power limiter is further configured to:
   receive the terminal grid voltage feedback signal; and,
   analyze the terminal grid voltage feedback signal to identify the occurrence of the grid contingency event.

3. A system in accordance with claim 2, wherein the power limiter is configured to generate the first power command signal that corresponds to the grid contingency event when the terminal grid voltage feedback signal indicates that a terminal grid voltage is below a predefined level.

4. A system in accordance with claim 1, wherein the power limiter is configured to generate the first power command signal that corresponds to the grid contingency event when the PLL error signal is above a predefined level.

5. A system in accordance with claim 1, further comprising a power regulator coupled to the power limiter, the power regulator configured to:
   receive the first power command signal and the terminal grid voltage feedback signal;
   generate a third power command signal based at least partially on the first power command signal and the terminal grid voltage feedback signal; and,
   transmit the third power command signal to the converter interface controller.

6. A system in accordance with claim 5, wherein the third power command signal directs the converter interface controller to rapidly reduce a real current output by a corresponding power converter after identification of the grid contingency event.

7. A system in accordance with claim 6, wherein the third power command signal directs the converter interface controller to slowly increase the real current output by the corresponding power converter after a recovery from the grid contingency event.

8. A system in accordance with claim 1, wherein the second power command signal comprises a reactive current command signal.

9. A system in accordance with claim 8, wherein the reactive current command signal directs the converter interface controller to increase a reactive component of current output by a corresponding power converter after identification of the grid contingency event.

10. A system in accordance with claim 1, wherein the power limiter is further configured to receive a reference power control signal and to identify an occurrence of the grid contingency event by comparing at least one of the PLL error signal and the terminal grid voltage feedback signal to the reference power control signal.

11. A system in accordance with claim 1, wherein the power limiter system is included within a wind farm, the wind farm comprising a plurality of wind turbines.

12. A system in accordance with claim 11, further comprising a higher-level control coupled to the power limiter and configured to:
   receive a wind farm input signal corresponding to a voltage measurement at a point of common coupling for the plurality of wind turbines;
   generate a curtailment signal based at least partially on the wind farm input signal; and,
   transmit the curtailment signal to the power limiter.

13. A system in accordance with claim 12, wherein the power limiter is further configured to generate the first power command signal that curtails an output power of a wind turbine associated with the power limiter in response to receipt of the curtailment signal.

14. A system in accordance with claim 12, wherein the higher-level control is configured to monitor the voltage at the point of common coupling for the plurality of wind turbines and to generate the curtailment signal when the voltage has remained below a predefined level for more than a predefined period of time.

15. A power limiter system for reducing pole-slipping within an electric generator coupled to a power grid, said system comprising:
   a power limiter configured to:
      receive a phase locked loop (PLL) error signal;
      analyze the PLL error signal to identify an occurrence of a grid contingency event; and,
      generate a first power command signal corresponding to the occurrence of the grid contingency event;
   a power regulator coupled to said power limiter, said power regulator configured to:
      receive the first power command signal;
      generate a second power command signal based at least partially on the first power command signal; and,
      transmit the second power command signal to a converter interface controller; and,
   a memory configured to store at least one variable that corresponds to identification of the occurrence of the grid contingency event.

16. A system in accordance with claim 15, wherein said power limiter is configured to generate the first power command signal that corresponds to the grid contingency event when the PLL error signal is above a predefined level.

17. A system in accordance with claim 15, wherein said power limiter is further configured to receive a reference power control signal and to identify the occurrence of the grid contingency event by comparing the PLL error signal to the reference power control signal.

18. A system in accordance with claim 15, wherein the second power command signal directs the converter interface controller to rapidly reduce a real current output by a corresponding power converter after identification of the grid contingency event.

19. A system in accordance with claim 15, wherein the third power command signal directs the converter interface controller to slowly increase the real current output by the corresponding power converter after a recovery from the grid contingency event.

* * * * *